(12) United States Patent (10) Patent No.: US 12,589,943 B2
Cornelius et al. (45) Date of Patent: Mar. 31, 2026

(54) STORAGE SYSTEM

(71) Applicant: Ocado Innovation Limited, Hatfield (GB)

(72) Inventors: Matthew Cornelius, Las Vegas, NV (US); James Wigglesworth, Las Vegas, NV (US); Thomas Clancy, Chelmsford (GB)

( * ) Notice: Subject to any disclaimer, the term of this patent is extended or adjusted under 35 U.S.C. 154(b) by 605 days.

(21) Appl. No.: 18/147,428

(22) Filed: Dec. 28, 2022

(65) Prior Publication Data

US 2024/0217745 A1 Jul. 4, 2024

(51) Int. Cl.
*B65G 1/137* (2006.01)
*B65G 1/04* (2006.01)

(52) U.S. Cl.
CPC ......... *B65G 1/1375* (2013.01); *B65G 1/0464* (2013.01)

(58) Field of Classification Search
CPC .. B65G 1/0478; B65G 1/0464; B65G 1/1375; B65G 1/1373; B65G 1/04; B65G 1/0457; B65G 1/06; B65G 1/065; B65G 47/90; B65G 2811/0663; B25J 15/0052; B25J 15/0061; B25J 15/0057; B25J 5/02; B25J 15/00
See application file for complete search history.

(56) References Cited

U.S. PATENT DOCUMENTS

| | | |
|---|---|---|
| 10,947,042 B2 | 3/2021 | Hognaland |
| 2018/0319590 A1* | 11/2018 | Lindbo ................ B65G 1/1373 |

| | | |
|---|---|---|
| 2018/0333841 A1 | 11/2018 | Bastian, II et al. |
| 2020/0156871 A1* | 5/2020 | Fosnight ................ B65G 1/065 |
| 2021/0001475 A1 | 1/2021 | Miller |
| 2021/0032034 A1* | 2/2021 | Kalouche ............... B25J 9/1612 |
| 2021/0221618 A1* | 7/2021 | Austrheim ........... B65G 1/0478 |

(Continued)

FOREIGN PATENT DOCUMENTS

| | | |
|---|---|---|
| GB | 2606853 A | 11/2022 |
| GB | 2613690 A | 6/2023 |
| WO | WO 2020097502 A2 | 5/2020 |

(Continued)

OTHER PUBLICATIONS

Office Action issued on Jan. 7, 2025 by the UK Intellectual Property Office in GB Application No. 2302603.2 (3 pages) corresponding to Applicant's U.S. Appl. No. 18/147,428.

(Continued)

*Primary Examiner* — Timothy R Waggoner
(74) *Attorney, Agent, or Firm* — Gregory Matt McCloskey

(57) ABSTRACT

A robotic picking system which does not require grid area to be reserved for picking stations and which enables efficient automated picking. There is provided a storage system including a first set of tracks extending in a first direction, a second set of tracks extending in a second direction transverse to the first direction, to form a grid comprising a plurality of grid cells, a framework structure on which the first set of tracks and the second set of tracks are received such that a stack of containers may be stored below the plurality of grid cells, a plurality of load-handling devices for lifting and moving containers stacked in stacks within the storage system, each of the load-handling devices being configured to move on the tracks above the stacks of containers at the top level of the grid.

20 Claims, 13 Drawing Sheets

(56) References Cited

U.S. PATENT DOCUMENTS

2022/0073279 A1     3/2022   Austrheim et al.

FOREIGN PATENT DOCUMENTS

| WO | WO 2020097502 A9 | 10/2020 |
| WO | WO 2021122218 A1 | 6/2021 |

OTHER PUBLICATIONS

Combined Search and Examination Report, dated Jul. 18, 2023, for United Kingdom Patent Application No. GB2302603.2. (7 pages).
International Search Report and Written Opinion, dated Apr. 10, 2024, for International Patent Application No. PCT/EP2023087839. (16 pages).

\* cited by examiner

31

33

35

37

39

41

43

9

STORAGE SYSTEM

TECHNICAL FIELD

The present disclosure relates generally to the field of automated storage and retrieval systems for use in warehouses and/or fulfilment centres and more specifically to an automated storage and retrieval system which comprises a robotic picking arm.

BACKGROUND

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 1 to 4 of the accompanying drawings.

FIG. 1 illustrates an automated storage and retrieval structure 1 comprising upright members 3 and horizontal members 5, 7 which are supported by the upright members 3. The horizontal members 5 extend parallel to one another and the illustrated x-axis. The horizontal members 7 extend parallel to one another and the illustrated y-axis, and transversely to the horizontal members 5. The upright members 3 extend parallel to one another and the illustrated z-axis, and transversely to the horizontal members 5, 7. The horizontal members 5, 7 form a grid pattern defining a plurality of grid cells. In the illustrated example, containers 9 are arranged in stacks 11 beneath the grid cells defined by the grid pattern, one stack 11 of containers 9 per grid cell.

FIG. 2 shows a large-scale plan view of a section of track structure 13 forming part of the storage structure 1 illustrated in FIG. 1 and located on top of the horizontal members 5, 7 of the storage structure 1 illustrated in FIG. 1. The track structure 13 may be provided by the horizontal members 5, 7 themselves (e.g. formed in or on the surfaces of the horizontal members 5, 7) or by one or more additional components mounted on top of the horizontal members 5, 7. The illustrated track structure 13 comprises x-direction tracks 17 and y-direction tracks 19, i.e. a first set of tracks 17 which extend in the x-direction and a second set of tracks 19 which extend in the y-direction, transverse to the tracks 17 in the first set of tracks 17. The tracks 17, 19 define apertures 15 at the centres of the grid cells. The apertures 15 are sized to allow containers 9 located beneath the grid cells to be lifted and lowered through the apertures 15. The x-direction tracks 17 are provided in pairs separated by channels 21, and the y-direction tracks 19 are provided in pairs separated by channels 23. Other arrangements of track structure may also be possible.

FIG. 3 shows a plurality of load-handling devices 31 moving on top of the storage structure 1 illustrated in FIG. 1. The load-handling devices 31, which may also be referred to as robots 31 or bots 31, are provided with sets of wheels to engage with corresponding x- or y-direction tracks 17, 19 to enable the bots 31 to travel across the track structure 13 and reach specific grid cells. The illustrated pairs of tracks 17, 19 separated by channels 21, 23 allow bots 31 to occupy (or pass one another on) neighbouring grid cells without colliding with one another.

As illustrated in detail in FIG. 4, a bot 31 comprises a body 33 in or on which are mounted one or more components which enable the bot 31 to perform its intended functions. These functions may include moving across the storage structure 1 on the track structure 13 and raising or lowering containers 9 (e.g. from or to stacks 11) so that the bot 31 can retrieve or deposit containers 9 in specific locations defined by the grid pattern.

The illustrated bot 31 comprises first and second sets of wheels 35, 37 which are mounted on the body 33 of the bot 31 and enable the bot 31 to move in the x- and y-directions along the tracks 17 and 19, respectively. In particular, two wheels 35 are provided on the shorter side of the bot 31 visible FIG. 4, and a further two wheels 35 are provided on the opposite shorter side of the bot 31 (side and further two wheels 35 not visible in FIG. 4). The wheels 35 engage with tracks 17 and are rotatably mounted on the body 33 of the bot 31 to allow the bot 31 to move along the tracks 17.

Analogously, two wheels 37 are provided on the longer side of the bot 31 visible in FIG. 4, and a further two wheels 37 are provided on the opposite longer side of the bot 31 (side and further two wheels 37 not visible in FIG. 4). The wheels 37 engage with tracks 19 and are rotatably mounted on the body 33 of the bot 31 to allow the bot 31 to move along the tracks 19.

The bot 31 also comprises container-lifting means 39 configured to raise and lower containers 9. The illustrated container-lifting means 39 comprises four tapes or reels 41 which are connected at their lower ends to a container-engaging assembly 43. The container-engaging assembly 43 comprises engaging means (which may, for example, be provided at the corners of the assembly 43, in the vicinity of the tapes 41) configured to engage with features of the containers 9. For instance, the containers 9 may be provided with one or more apertures in their upper sides with which the engaging means can engage. Alternatively or additionally, the engaging means may be configured to hook under the rims or lips of the containers 9, and/or to clamp or grasp the containers 9. The tapes 41 may be wound up or down to raise or lower the container-engaging assembly, as required. One or more motors or other means may be provided to effect or control the winding up or down of the tapes 41.

As can be seen in FIG. 5, the body 33 of the illustrated bot 31 has an upper portion 45 and a lower portion 47. The upper portion 45 is configured to house one or more operation components (not shown). The lower portion 47 is arranged beneath the upper portion 45. The lower portion 47 comprises a container-receiving space or cavity for accommodating at least part of a container 9 that has been raised by the container-lifting means 39. The container-receiving space is sized such that enough of a container 9 can fit inside the cavity to enable the bot 31 to move across the track structure 13 on top of storage structure 1 without the underside of the container 9 catching on the track structure 13 or another part of the storage structure 1. When the bot 31 has reached its intended destination, the container-lifting means 39 controls the tapes 41 to lower the container-gripping assembly 43 and the corresponding container 9 out of the cavity in the lower portion 47 and into the intended position. The intended position may be a stack 11 of containers 9 or an egress point of the storage structure 1 (or an ingress point of the storage structure 1 if the bot 31 has moved to collect a container 9 for storage in the storage structure 1). Although in the illustrated example the upper and lower portions 45, 47 are separated by a physical divider, in other embodiments, the upper and lower portions 45, 47 may not be physically divided by a specific component or part of the body 33 of the bot 31.

In some embodiments, the container-receiving space of the bot 31 may not be within the body 33 of the bot 31. For example, in some embodiments, the container-receiving space may be adjacent to the body 33 of the bot 31, e.g. in a cantilever arrangement with the weight of the body 33 of the bot 31 counterbalancing the weight of the container to be lifted. In such embodiments, a frame or arms of the container-lifting means 39 may protrude horizontally from the body 33 of the bot 31, and the tapes/reels 41 may be arranged at respective locations on the protruding frame/arms and configured to be raised and lowered from those locations to raise and lower a container into the container-receiving space adjacent to the body 33. The height at which the frame/arms is/are mounted on and protrude(s) from the body 33 of the bot 31 may be chosen to provide a desired effect. For example, it may be preferable for the frame/arms to protrude at a high level on the body 33 of the bot 31 to allow a larger container (or a plurality of containers) to be raised into the container-receiving space beneath the frame/arms. Alternatively, the frame/arms may be arranged to protrude lower down the body 33 (but still high enough to accommodate at least one container between the frame/arms and the track structure 13) to keep the centre of mass of the bot 31 lower when the bot 31 is loaded with a container.

To enable the bot 31 to move on the different wheels 35, 37 in the first and second directions, the bot 31 includes a wheel-positioning mechanism for selectively engaging either the first set of wheels 35 with the first set of tracks 17 or the second set of wheels 37 with the second set of tracks 19. The wheel-positioning mechanism is configured to raise and lower the first set of wheels 35 and/or the second set of wheels 37 relative to the body 33, thereby enabling the load-handling device 31 to selectively move in either the first direction or the second direction across the tracks 17, 19 of the storage structure 1.

The wheel-positioning mechanism may include one or more linear actuators, rotary components or other means for raising and lowering at least one set of wheels 35, 37 relative to the body 33 of the bot 31 to bring the at least one set of wheels 35, 37 out of and into contact with the tracks 17, 19. In some examples, only one set of wheels is configured to be raised and lowered, and the act of lowering the one set of wheels may effectively lift the other set of wheels clear of the corresponding tracks while the act of raising the one set of wheels may effectively lower the other set of wheels into contact with the corresponding tracks. In other examples, both sets of wheels may be raised and lowered, advantageously meaning that the body 33 of the bot 31 stays substantially at the same height and therefore the weight of the body 33 and the components mounted thereon does not need to be lifted and lowered by The system described with reference to FIGS. 1 to 4 has many advantages and is suitable for a wide range of storage and retrieval operations.

In particular, it allows very dense storage of product, and it provides a very economical way of storing a huge range of different items in the containers 9, while allowing reasonably economical access to all of the containers when required for picking.

As shown in FIG. 3, a plurality of identical load handling devices or bots 31 are provided, so that each load handling device 31 can operate simultaneously to increase the throughput of the system. The system illustrated in FIG. 3 may include specific locations, known as ports, at which containers can be transferred into or out of the system. An additional conveyor system (not shown) is associated with each port, so that containers transported to a port by a load handling device 31 can be transferred to another location by the conveyor system, for example to a picking station (not shown).

Similarly, containers can be moved by the conveyor system to a port from an external location, for example to a container-filling station (not shown), and transported to a stack 12 by the load handling devices 30 to replenish the stock in the system.

Each load handling device 31 can lift and move one containers at a time. If it is necessary to retrieve a container ("target container") that is not located on the top of a stack, then the overlying containers ("non-target containers") must first be moved to allow access to the target containers. This is achieved in an operation referred to hereafter as "digging". During a digging operation, one of the load handling devices sequentially lifts each non-target container from the stack containing the target container and places it in a vacant position within another stack. The target container can then be accessed by the load handling device and moved to a port for further transportation.

Each of the load handling devices is under the control of a central computer. Each individual container in the system is tracked, so that the appropriate containers can be retrieved, transported and replaced as necessary. For example, during a digging operation, the locations of each of the non-target containers is logged, so that the non-target containers can be tracked.

The system described with reference to FIGS. 1 to 5 has many advantages and is suitable for a wide range of storage and retrieval operations. In particular, it allows very dense storage of product, and it provides a very economical way of storing a huge range of different items in the containers, while allowing reasonably economical access to all of the containers when required for picking.

WO 2016/198565 discloses an automated storage and retrieval system in which a robotic picking arm is arranged to pick items from containers received in the grid of the storage and retrieval system. The applicant's co-pending application PCT/EP2022/069511 discloses further improvements relating to on-grid robotic picking.

SUMMARY

In general terms, the disclosure introduces a robotic picking system which does not require grid area to be reserved for picking stations and which enables efficient automated picking.

According to an aspect of the present disclosure there is provided a storage system comprising: a first set of tracks extending in a first direction; a second set of tracks extending in a second direction transverse to the first direction, to form a grid comprising a plurality of grid cells, a framework structure on which the first set of tracks and the second set of tracks are received such that a stack of containers may be stored below the plurality of grid cells; a plurality of load-handling devices for lifting and moving containers stacked in stacks within the storage system, each of the load-handling devices being configured to move on the tracks above the stacks of containers at the top level of the grid.

By removing the picking arm from the surface of the grid, it is possible to retain many of the advantages of locating the picking arm on the grid without the disadvantage of losing grid spaces caused by the location of the picking arm on the grid.

BRIEF DESCRIPTION OF THE DRAWINGS

Embodiments of the disclosure will now be described by way of example only with reference to the accompanying drawings, in which like reference numbers designate the same or corresponding parts, and in which.

DETAILED DESCRIPTION

Figure 1:
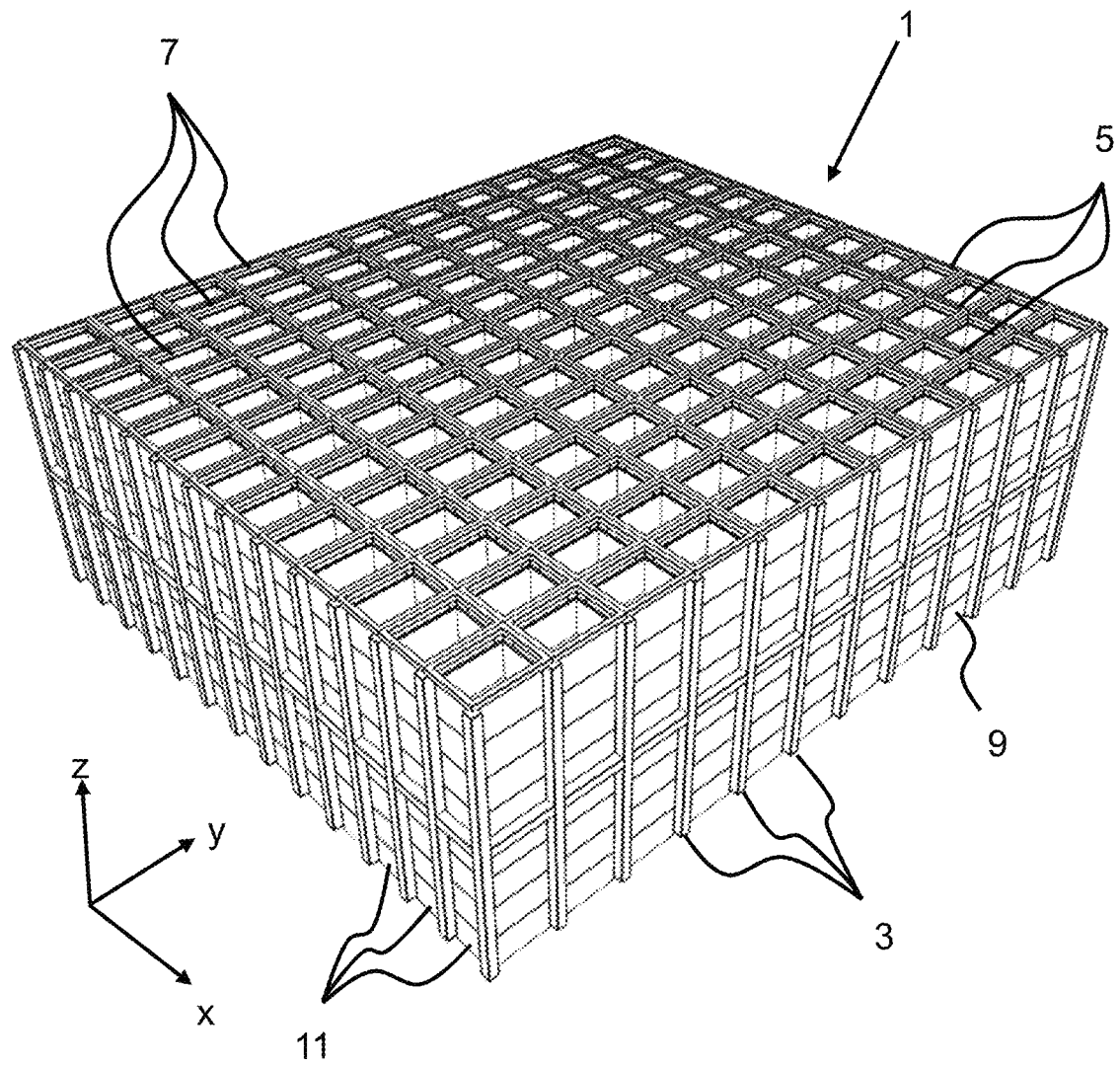
FIG. 1 shows a schematic depiction of an automated storage and retrieval structure.
Figure 2:
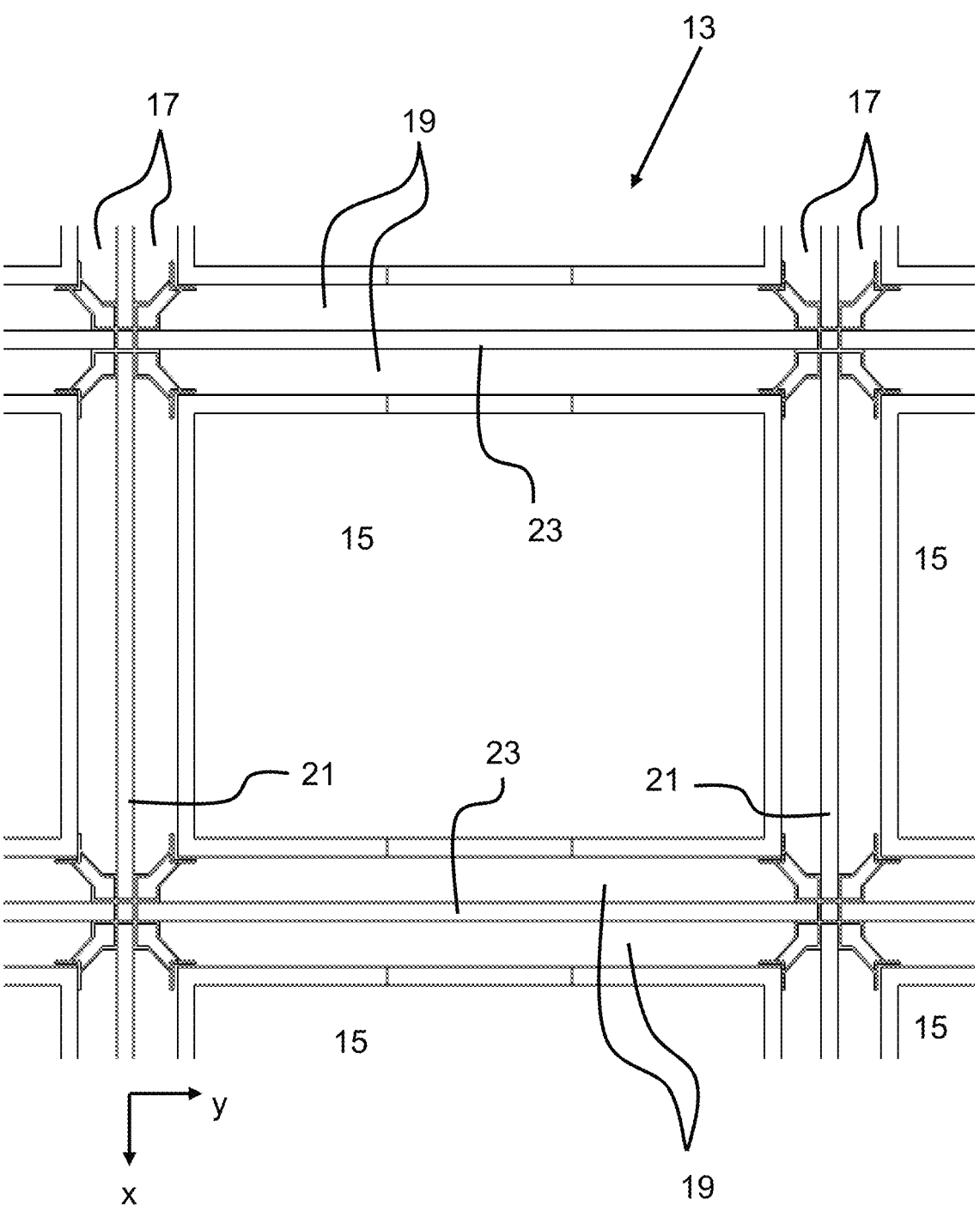
FIG. 2 shows a schematic depiction of s plan view of a section of track structure forming part of the storage structure of FIG. 1.
Figure 3:
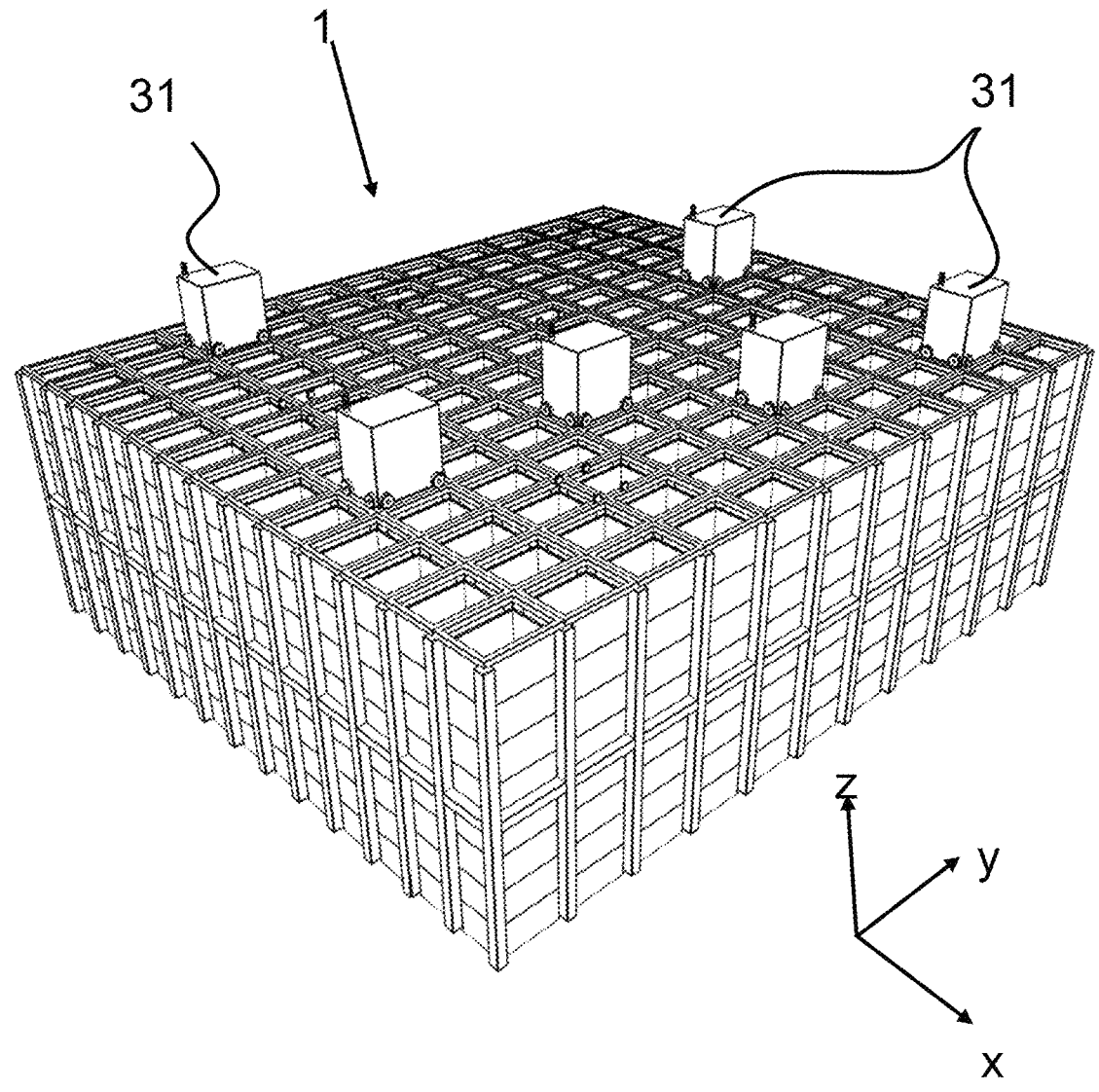
FIG. 3 shows a schematic depiction of a plurality of load-handling devices moving on top of the storage structure of FIG. 1.
Figure 4:
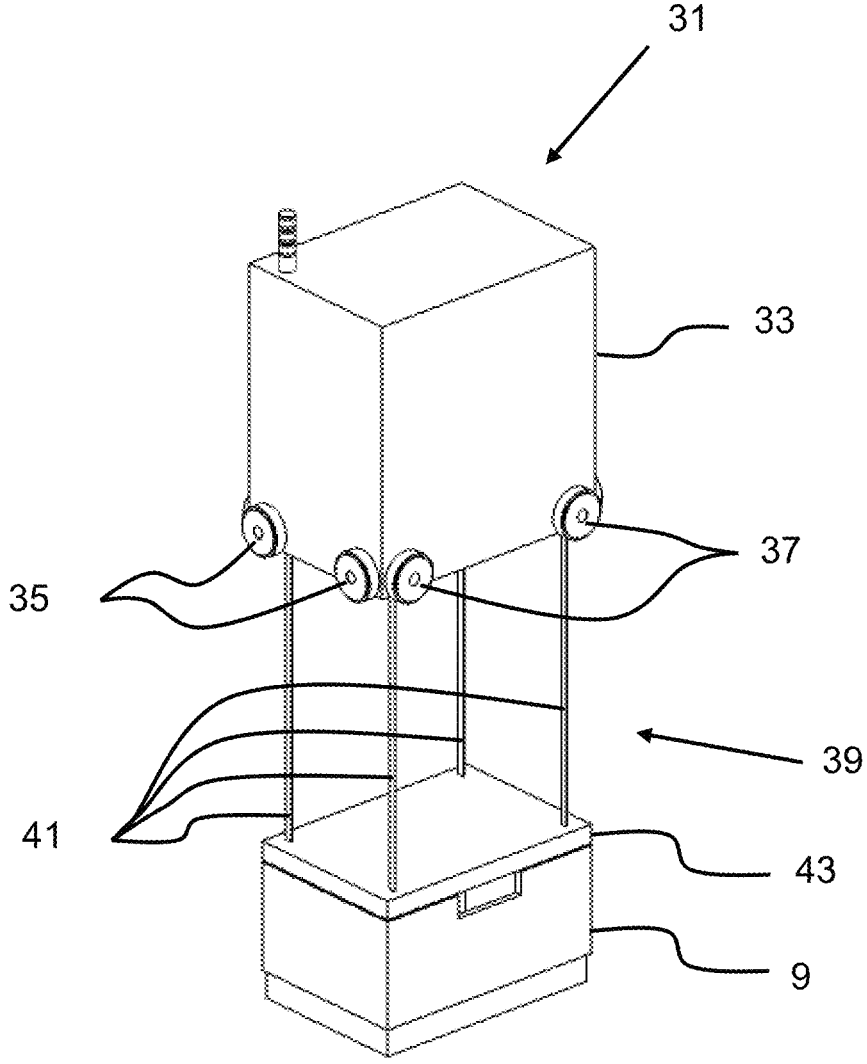
FIGS. 4 and 5 show a schematic depiction of a load handling device interacting with a container.
Figure 5:
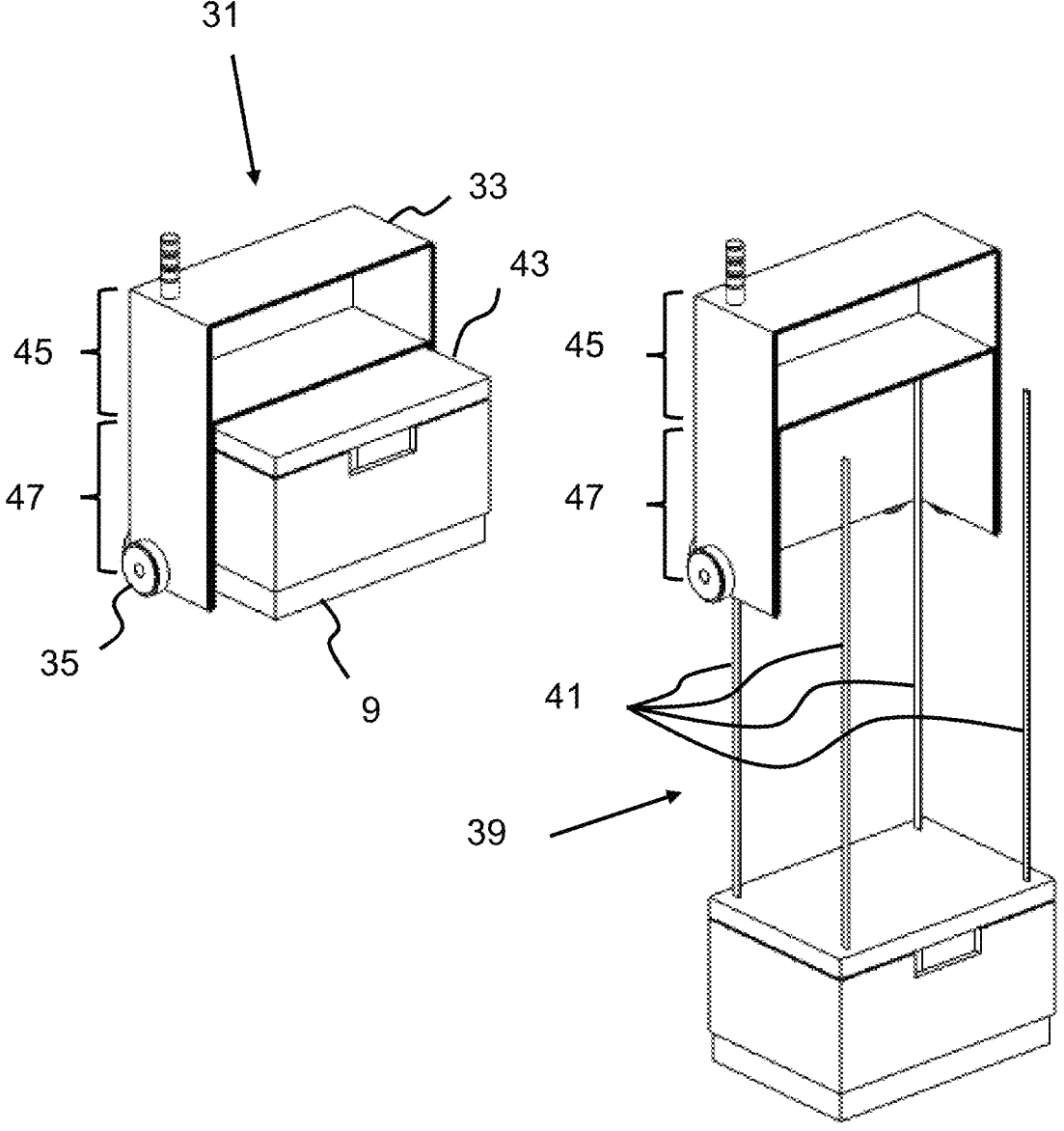
Figure 6:
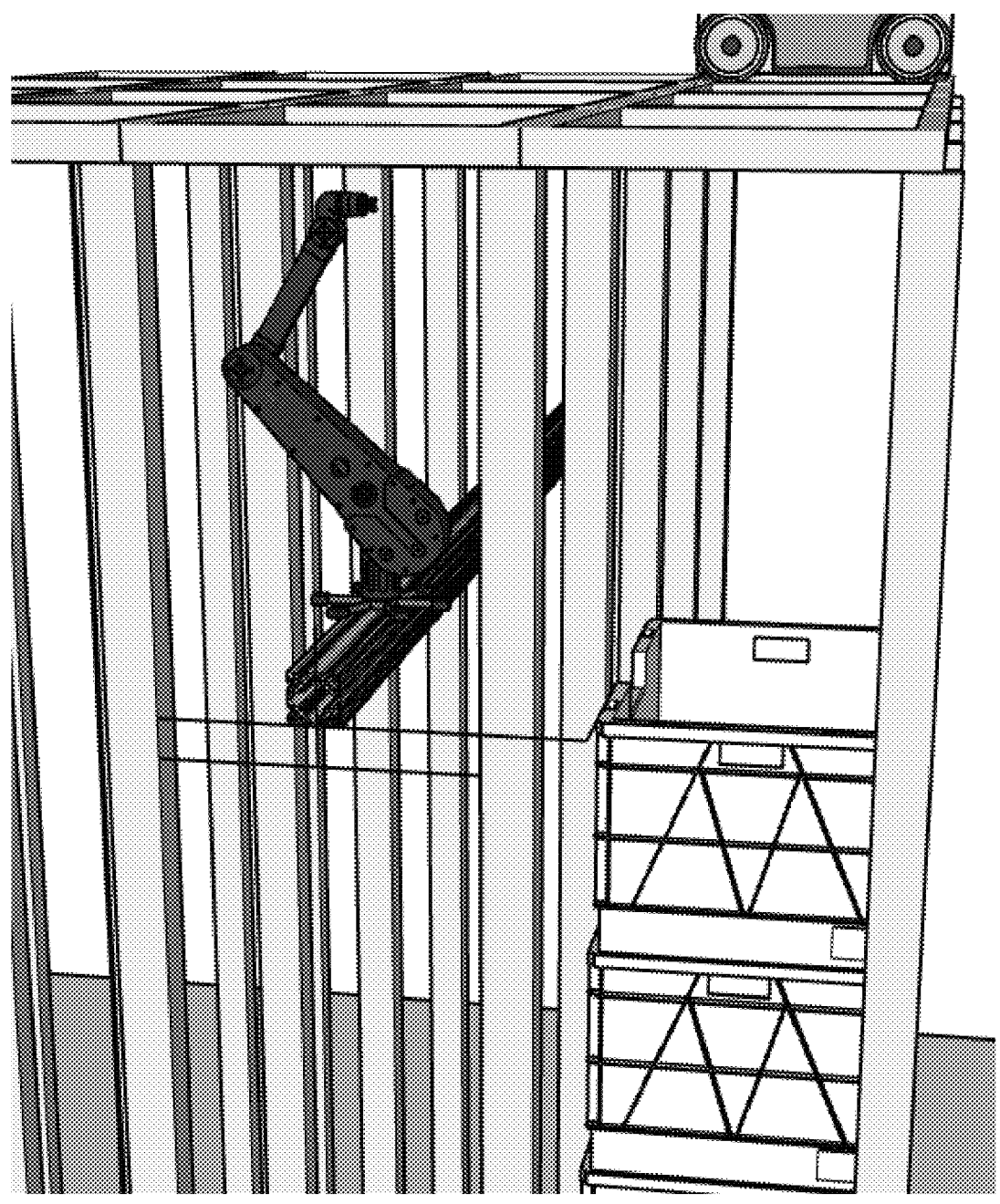
FIGS. 6-9 show different views of a schematic depiction of a storage system according to the present disclosure.
Figure 7:
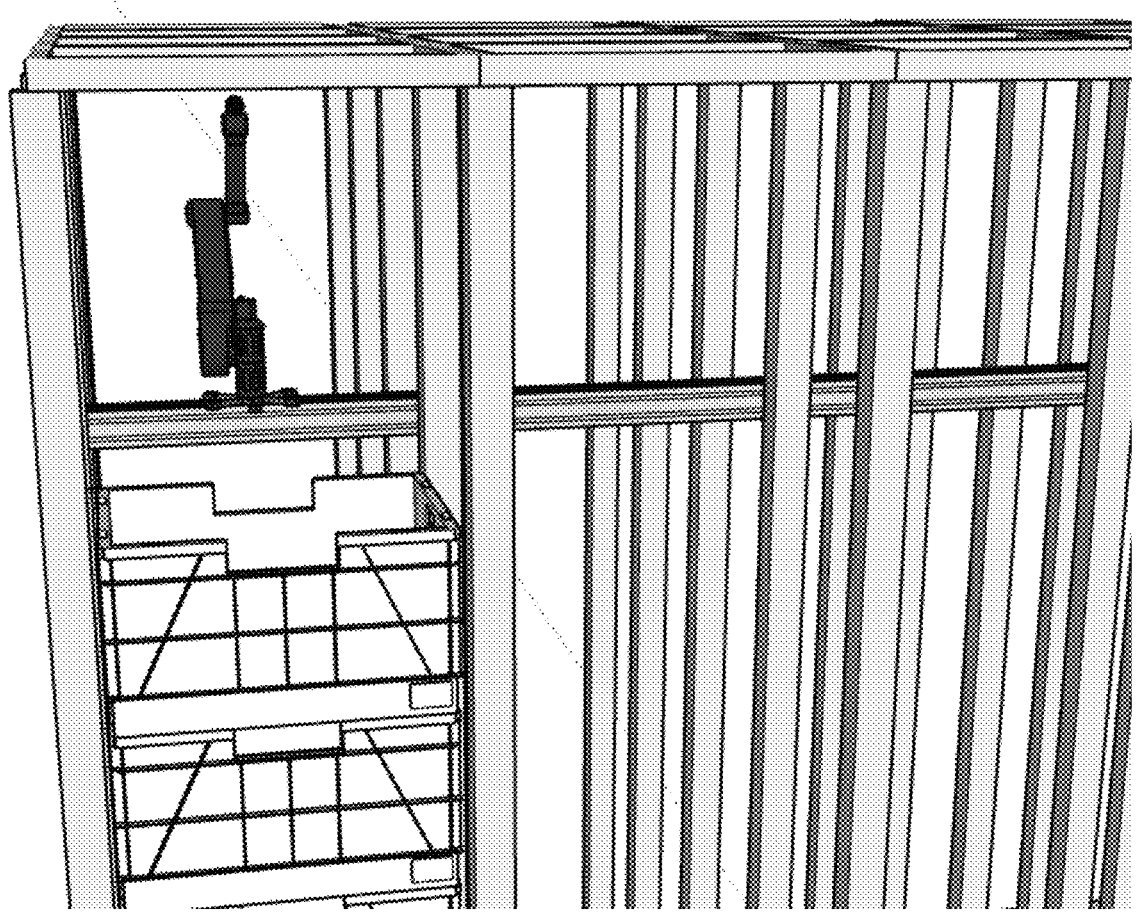
Figure 8:
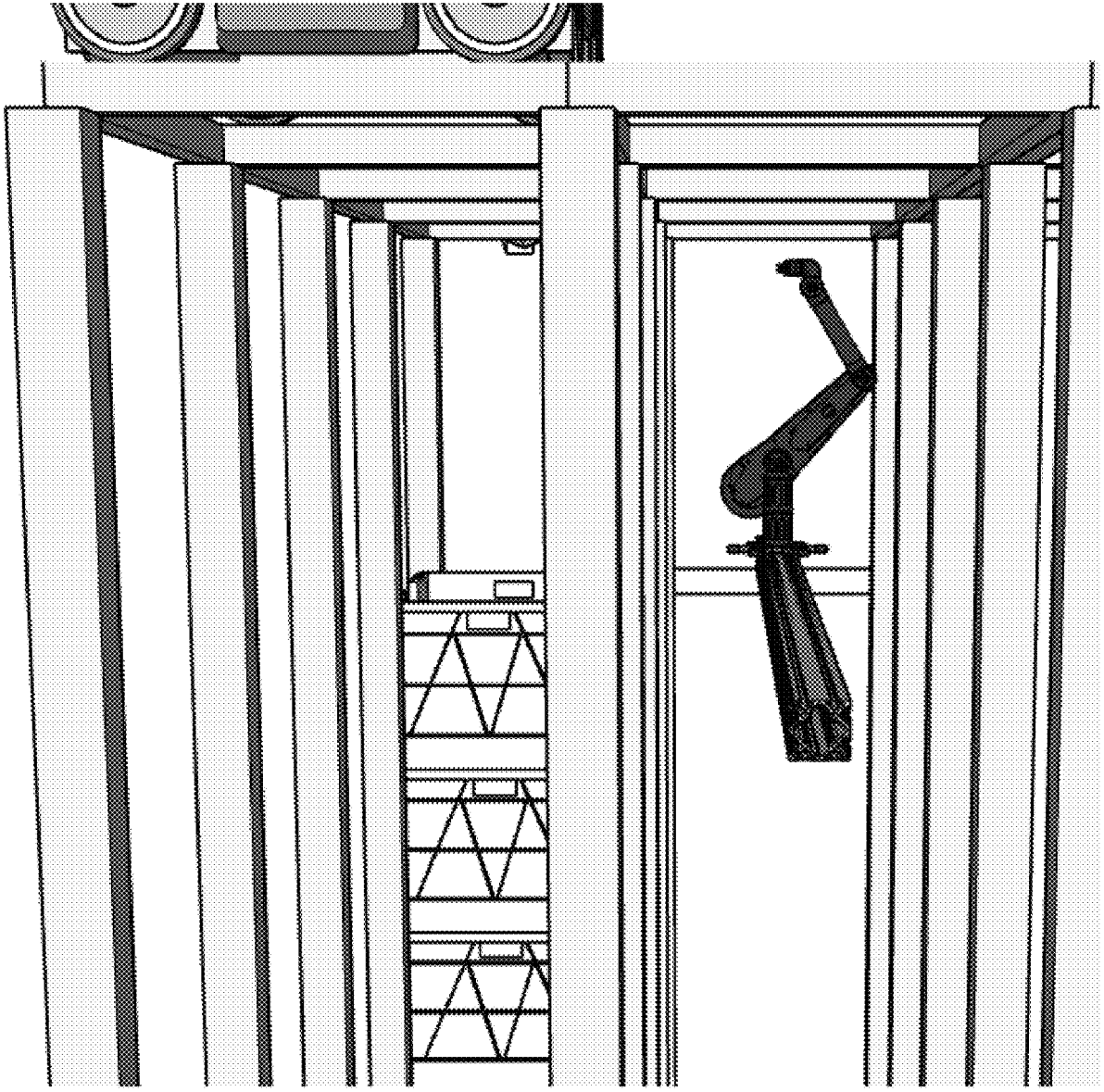
Figure 9:
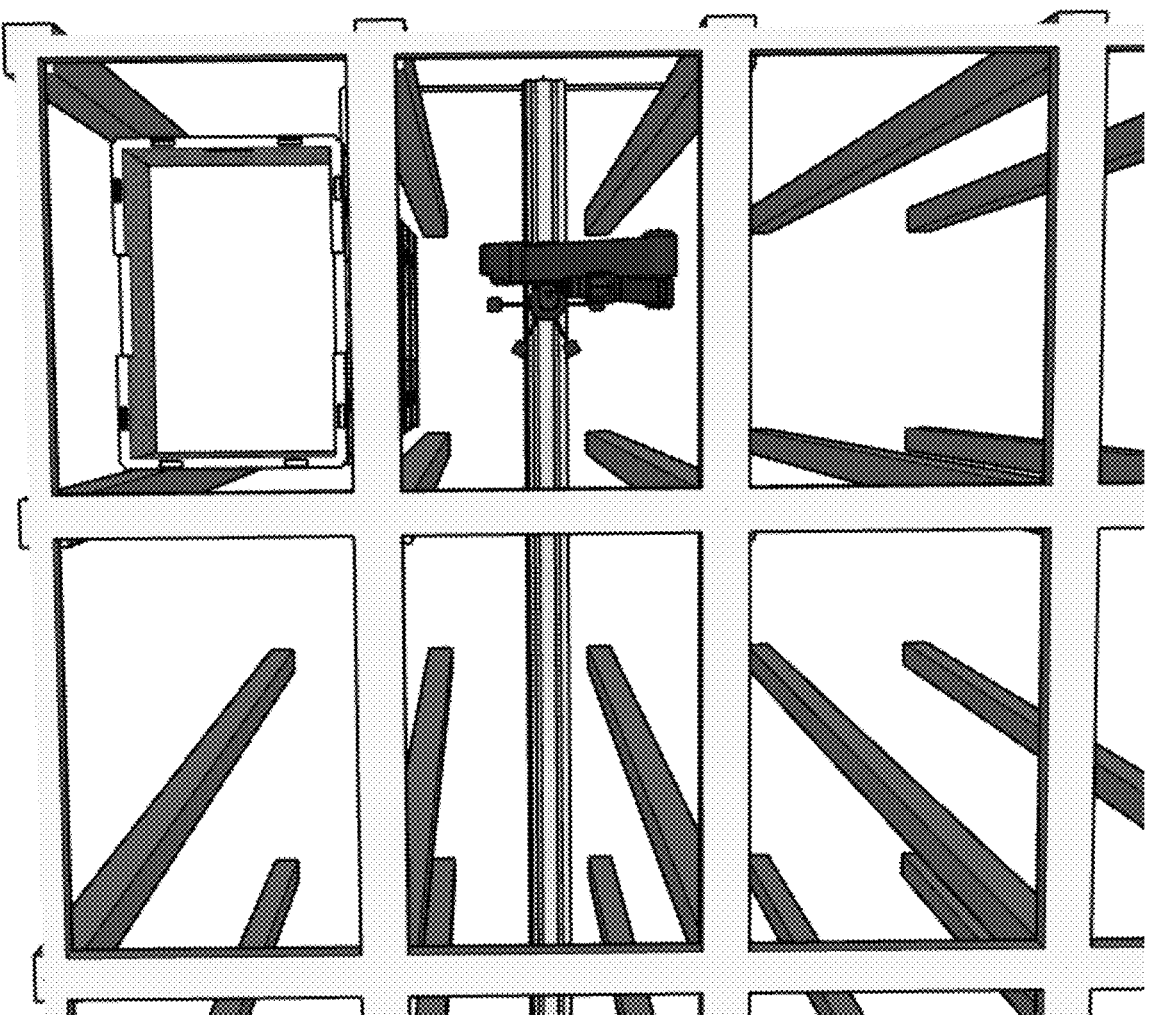

FIGS. 6 to 9 are different views of a schematic depiction of a storage system 100 according to the present disclosure. The storage system 100 has many common features with the known storage system discussed above with reference to FIGS. 1-5. The storage system 100 further comprises a rail 200 which is installed within the storage structure. The rail is located below the top level of the grid (that is, the level of the grid upon which the bots move such that a robotic picking arm 300 can be fitted onto the rail. The robotic picking arm is movably coupled to the rail such that it can move along the rail. The rail may be located such that the robotic arm is able to move without impinging upon the horizontal members 5, 7 which form the top level of the grid.

Alternatively, the robotic arm may be programmed so that it does not extend in the vertical direction such that the robotic arm would impact the horizontal members 5, 7 which form the top level of the grid. The rail may be supported by a plurality of the horizontal members of the storage structure. As an alternative, or in addition, further reinforcement members may be provided to support the rail. For example, a mezzanine floor may be provided such that the rail can be installed to the mezzanine floor. The mezzanine floor may be extended horizontally to one or both sides of the rail such that it may support the containers used by the robotic picking arm in the picking process (see below).

The robotic picking arm 300 comprises a rail interface 310, base 320, first arm region 330, second arm region 340 and an end effector 350. The first arm region is rotatably coupled to the base 320 by first joint 325. The second arm region is rotatably coupled to the first arm region by second joint 335. The end effector is rotatably coupled to the second arm region by third joint 345. The base is connected to the rail interface such that the actuation of the rail interface can cause the robotic picking arm to move along the rail. The robotic picking arm can be controlled such that the end effector of robotic picking arm can be moved into the space defined by a first container to pick an item (for example, a product each) stored within the first container using the end effector. The robotic picking arm can then be actuated such that the end effector is moved so that it is received within the space defined by a second container. The item can then be placed into the second container by a further actuation of the end effector. Alternatively, the item may be placed into a bag or a further container which is received within the second container. The first and the second containers may be located on opposite sides of the rail 200 such that the item can be transferred from the first container to the second container without the robotic picking arm having to move along the rail. Alternatively, although the operation is less efficient, the robotic picking arm may move along the rail before depositing the item into the second container. The end effector may be, for example, a suction cup, parallel jaw grippers, finger grippers etc. The robotic picking arm may be able to change the type of end effector that is used such that different types of product item may be picked.

Figure 10:
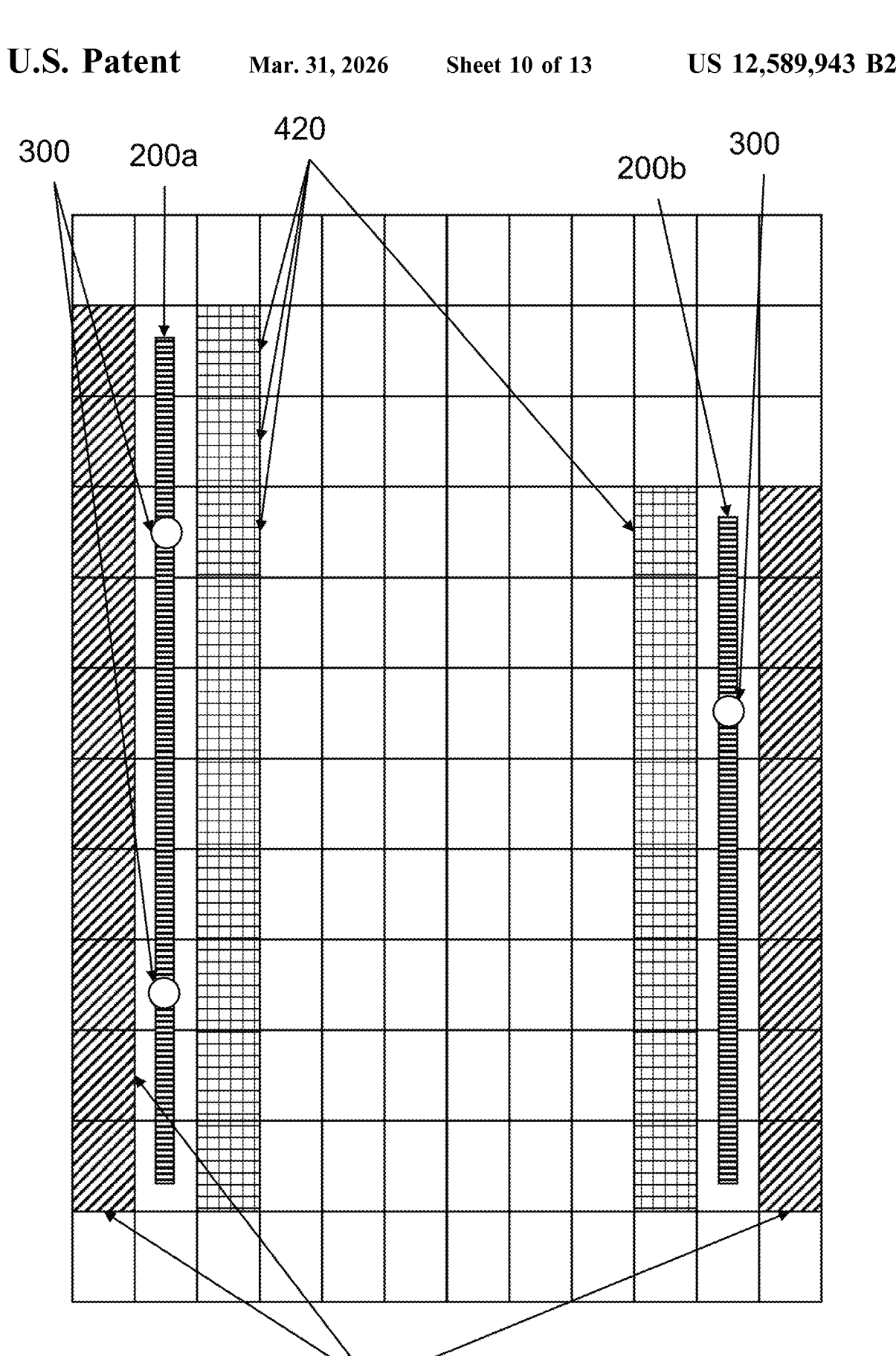
FIG. 10 shows a schematic depiction of an overhead view of a part of a storage system according to the present disclosure.

FIG. 10 shows a schematic depiction of an overhead view of a part of a storage system according to the present disclosure. FIG. 10 shows first rail 200a and second rail 200b received within the grid. It should be understood that the storage system may comprise a greater or lesser number of rails. The first rail 200a has two robotic picking arms 300 located upon it and the second rail 200b has one robotic picking arm 300 located upon it. A number of the grid cells located on a first side of each rail may be defined as a first picking location 410. Furthermore, a number of the grid cells located on the opposed side of each rail may be defined as a second picking location 420. The other grid cells which are not defined as the first picking location 410 or as the second picking location 420 may be regarded as being conventional grid cells and can be used for receiving containers which hold product items for picking or storage, in a conventional manner. As discussed above, a robotic picking arm is free to move along the rail on which it is located, such that it can transfer a product item between a container located in a first picking location 410 and a container located in a second picking location (or vice versa).

For the first rail each of the two robotic picking arms may have a respective defined region in which they operate. These regions may not have an overlap such that one of the robotic picking arms do not interfere or collide with the other robotic picking arm.

Alternatively, they may be controlled dynamically so that in operation they do not interfere or collide with each other. A rail may have more than two robotic picking arms located upon it, for example in accordance with the length of the rail and/or the capacity of the storage system.

Figure 11:
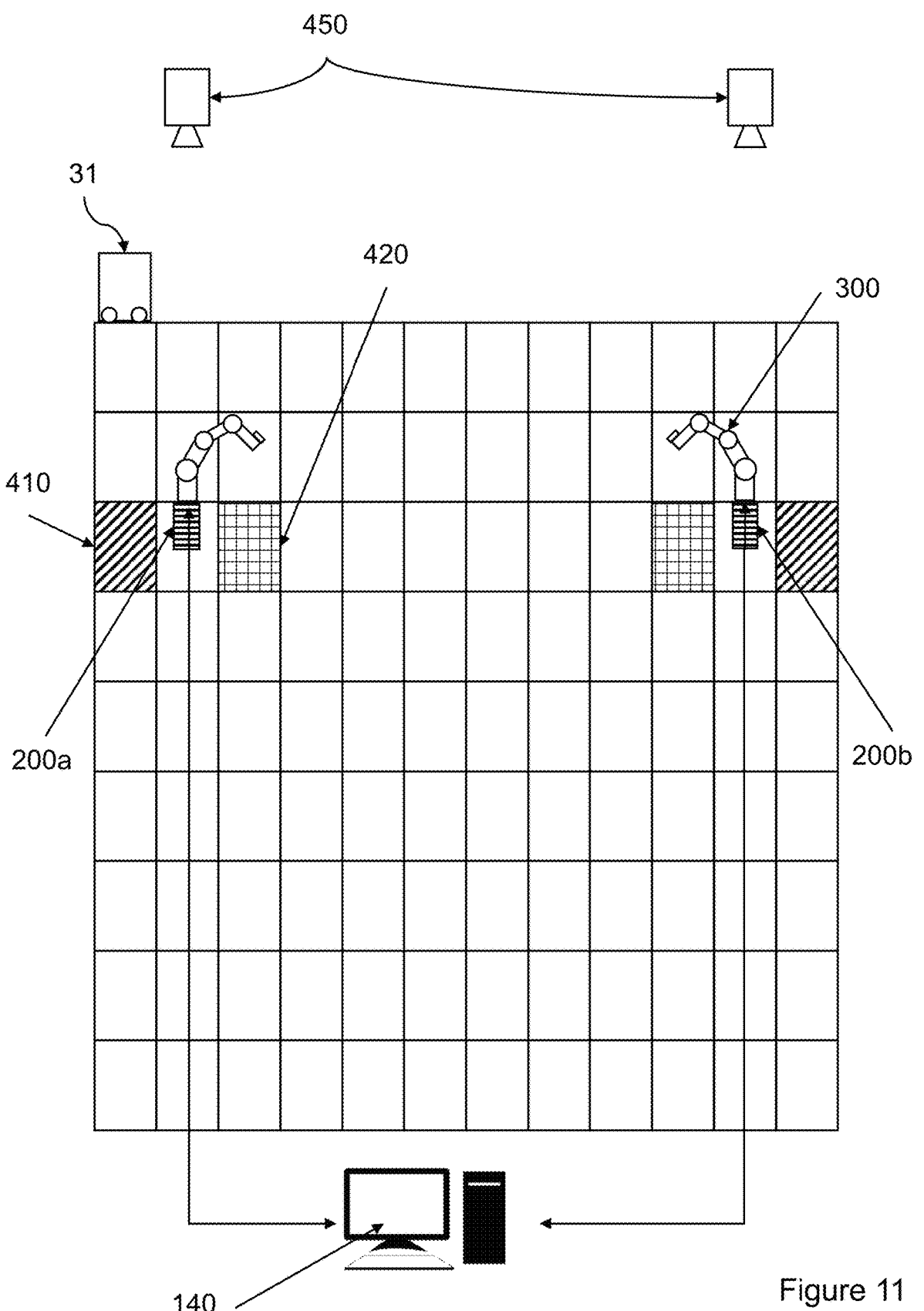
FIG. 11 shows a schematic depiction of a side view of a part of the storage system described with reference to FIG. 10.

FIG. 11 shows a schematic depiction of a side view of a part of the storage system described above with reference to FIG. 10. Cameras 450 are installed above each of the rails 200a, 200b, such that the images obtained from the camera can be processed by a computing device 140. The computing device is also communicably connected to each of the robotic picking arms such that the operation of each of the arms can be controlled. The images obtained from the cameras may be used in the control of the robotic picking arms. The cameras may comprise processing capability such that some of the image processing may be performed by the camera before processed data is transmitted to the computing device and/or a robotic picking arm. Similarly, each of the robotic picking arms may comprise processing capability such that some of the image processing may be performed by the robotic picking arms. Depending on the field of view of the camera and the length of a rail it may be necessary to install more than one camera above each rail. Furthermore, additional cameras may be installed above and to the side of the rail so that the interior of each of the containers received in the first picking location 410 and the second picking location 420 can be captured by a camera.

Figure 12:
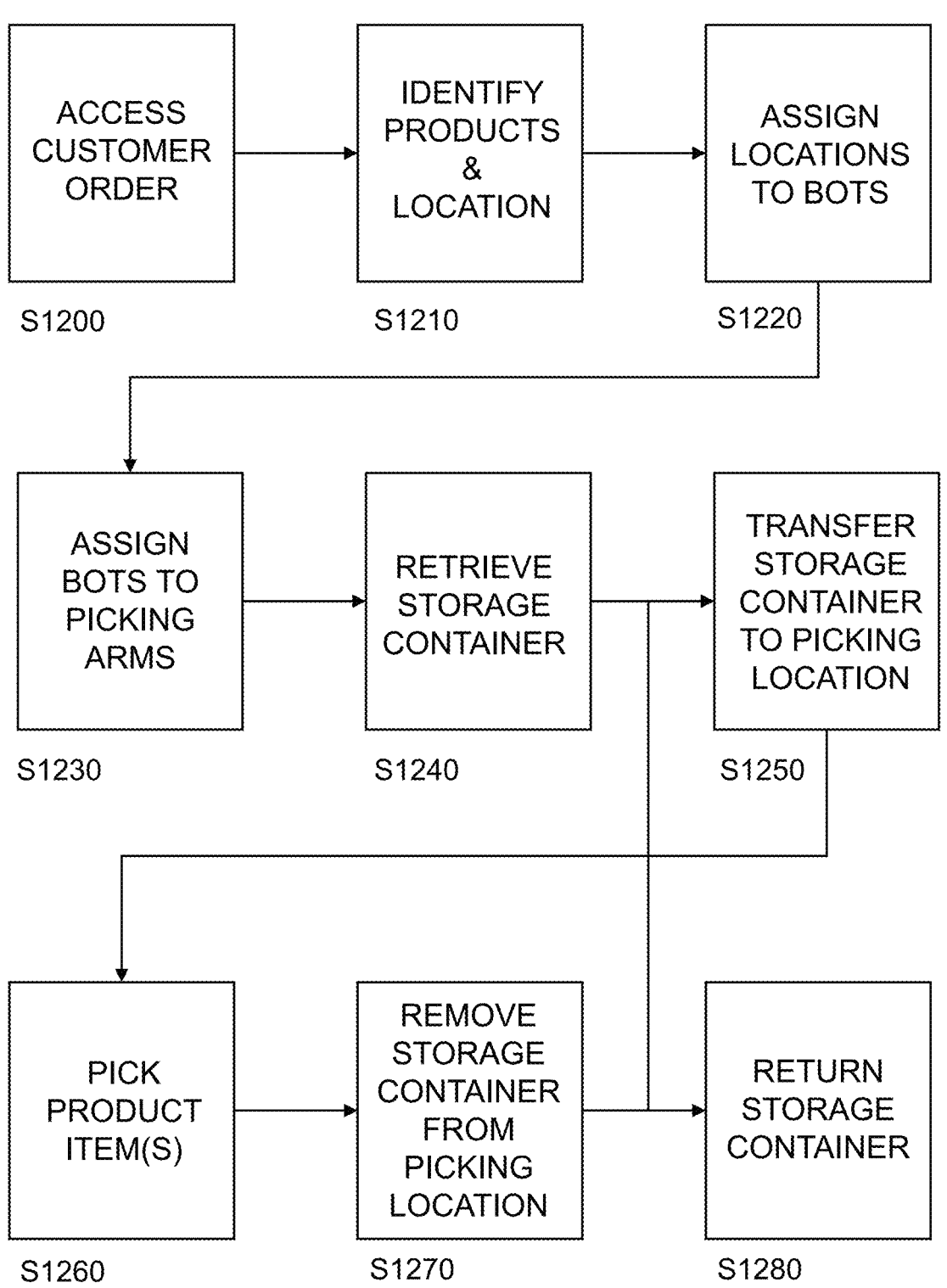
FIG. 12 shows a schematic depiction of a picking method according to the present disclosure.

The process by which a customer order can be picked will now be described with reference to FIG. 12, which shows a schematic depiction of a picking method according to the present invention. At step 1200, a customer order to be picked is accessed and processed. The central computer may comprise an ordering system which manages the delivery of customer orders and arranges for orders to be picked such that they may be sent out for delivery such that the order may be delivered to the customer in a pre-determined timeslot. At step S1210 each of the products which comprise the customer order processed in S1200 are identified and the respective storage container location for each product is determined. At step 1220 each of the storage container locations are assigned to one or more bots. It will be understood that the number of bots required to efficiently pick a customer order will vary with the number of storage containers which must be retrieved to fulfil the customer order, the location of the storage containers relative to the picking station, etc. A bot may perform multiple storage container retrieval movements during the fulfilment of a customer order.

At step 1230 each bot is assigned to a robotic picking arm. It should be understood that the storage system may comprise multiple zones, for example a refrigerated zone, a freezer zone, an ambient temperature zone etc., and that an order is likely to comprise products from more than one of these zones. Furthermore, each of the zones will comprise one or more robotic picking arms as it will be necessary to pick, for example, refrigerated products using a robotic picking arm within the refrigerated zone of the storage system. The assignment of a bot to a robotic picking arm may be made in accordance with the characteristics of the product to be picked and/or the robotic picking arm. For example, if a product is best suited to be picked by a suction end-effector then it will be assigned to a robotic picking arm which is operating with a suction end-effector (or which can be re-configured to operate with a suction end-effector by the time that the product has been delivered to the robotic picking arm).

At step S1240, each bot is activated to move to the location of an assigned storage container such that the storage container can be retrieved. If a storage container is not at the top of a container stack then the digging process (see above) will be carried out to retrieve the storage container. The bot may autonomously determine its own route across the grid to the location of the assigned storage container or a route may be determined and then transmitted to the bot. The route may be determined by the central computer. A method by which a bot may determine its route across the grid is disclosed in the applicant's co-pending application WO2017/186825. A method by which communications to and from a bot may be performed is disclosed in the applicant's co-pending application WO2015/185726.

At step S1250 the retrieved storage container is moved by the bot to one of the plurality of picking locations of the picking station to which the bot has been assigned. The identity of the picking location to be used may be determined and communicated to the bot. The bot will then deposit the retrieved storage container in the picking location to be used and moves to a further grid location. At step S1260 the picking process is performed, such that one or more eaches of the product held in a storage container are moved to a delivery container. The storage container may be received within a picking location which is adjacent to the picking location of the delivery container. One or more eaches of a product may be picked from a storage container to two or more delivery containers. The two or more delivery containers may be associated with different customer orders. Once the picking from the storage container is complete then at step S1270 a bot moves to the picking location of that storage container and retrieves the storage container from the picking location within the grid. At step S1280 the bot moves the storage container to a further grid location and deposits the storage container within the grid. Alternatively, the process may return to step S1250, wherein the bot moves to a further picking location such that the retrieved storage container may be deposited within that further picking location.

It should be understood that a storage container may be returned to the grid location from which it was retrieved in step S1240 but alternatively it may be deposited at another grid location. If the product held in a storage container will be required in a relatively short period of time then the storage container may be deposited in a grid location which is relatively close to the pick station to reduce the time required to retrieve the storage container for a subsequent picking action. The bot which deposits a storage container in step S1250 may wait for the end of the picking process to retrieve the storage container at step S1270. Alternatively, the bot may be allocated to a different task, for example retrieving a further storage container for which the picking process is complete, such that there is more efficient utilisation of the bot. In such a case, a further bot will be allocated to retrieve the storage container once the picking process has been completed.

Figure 13:
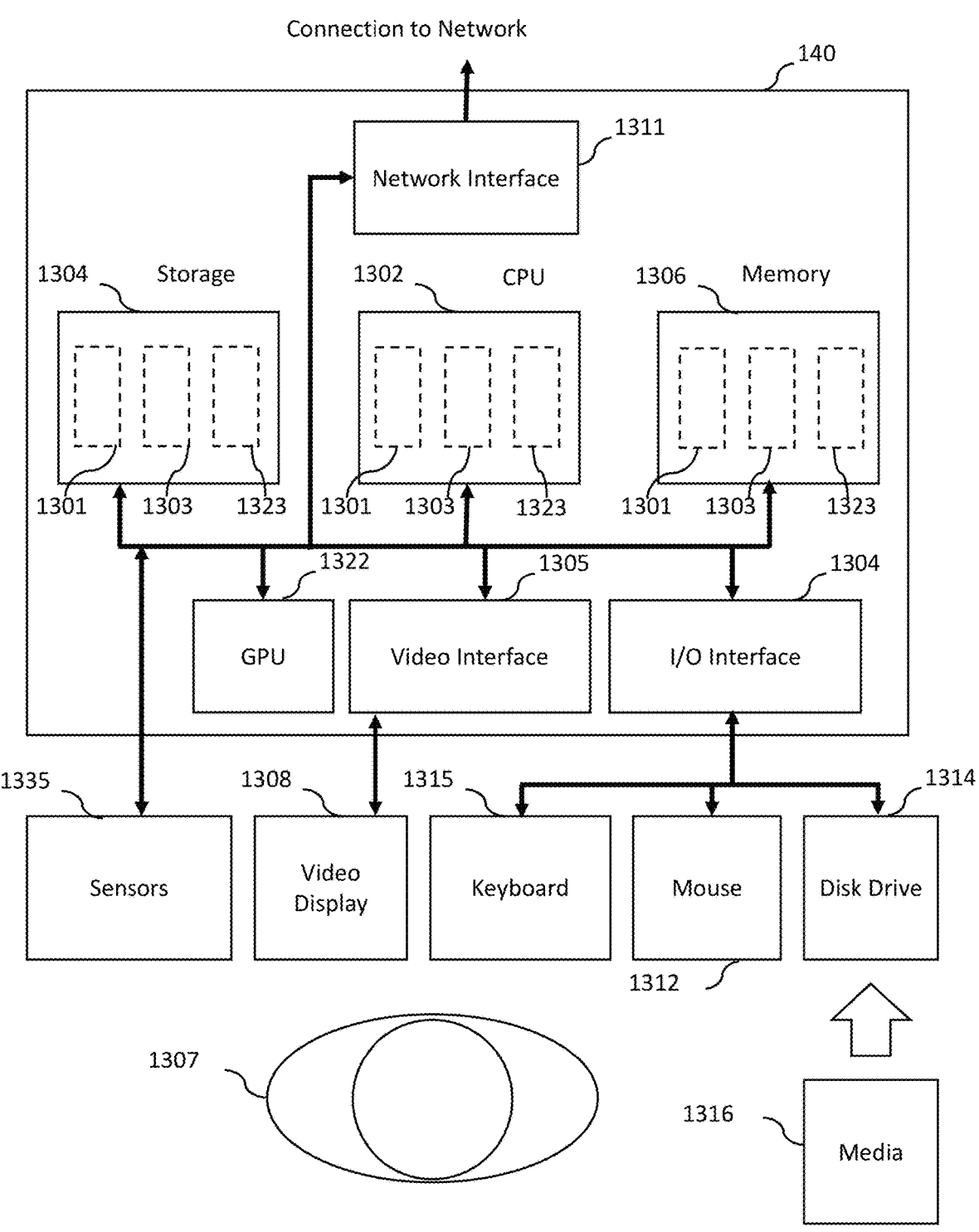
FIG. 13 shows a schematic depiction of a computer device.

A suitably configured computer device 140, and associated communications networks, devices, software and firmware may provide a platform for enabling one or more embodiments as described above. By way of example, FIG. 13 shows a schematic depiction of a computer device 140 that may include a central processing unit ("CPU") 1302 connected to a storage unit 1314 and to a random access memory 1306. The CPU 1302 may process an operating system 1301, application program 1303, and data 1323. The operating system 1301, application program 1303, and data 1323 may be stored in storage unit 1314 and loaded into memory 1306, as may be required. Computer device 140 may further include a graphics processing unit (GPU) 1322 which is operatively connected to CPU 1302 and to memory 1306 to offload intensive image processing calculations from CPU 1302 and run these calculations in parallel with CPU 1302. An operator 1307 may interact with the computer device 140 using a video display 1308 connected by a video interface 1305, and various input/output devices such as a keyboard 1315, mouse 1312, and disk drive or solid state drive 1314 connected by an I/O interface 1304. In a known manner, the mouse 1312 may be configured to control movement of a cursor in the video display 1308, and to operate various graphical user interface (GUI) controls appearing in the video display 1308 with a mouse button. The disk drive or solid state drive 1314 may be configured to accept computer readable media 1316. The computer device 140 may form part of a network via a network interface 1311, allowing the computer device 140 to communicate with other suitably configured data processing systems (not shown). One or more different types of sensors 1335 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present disclosure. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portions of a computing device, such as memory associated with a computer and/or a storage system.

In further aspects, the disclosure provides systems, devices, methods, and computer programming products, including non-transient machine-readable instruction sets, for use in implementing such methods and enabling the functionality described previously.

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis). In this document, the word "connect" and its derivatives are intended to include the possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, the word "support" and its derivatives are intended to include the possibilities of direct and indirect contact. For example, "x supports y" is intended to include the possibility that x directly supports and directly contacts y, with no intervening components, and the possibility that x indirectly supports y, with one or more intervening components contacting x and/or y. The word "mount" and its derivatives are intended to include the possibility of direct and indirect mounting. For example, "x is mounted on y" is intended to include the possibility that x is directly mounted on y, with no intervening components, and the possibility that x is indirectly mounted on y, with one or more intervening components. In this document, the word "comprise" and its derivatives are intended to have an inclusive rather than an exclusive meaning. For example, "x comprises y" is intended to include the possibilities that x includes one and only one y, multiple y's, or one or more y's and one or more other elements. Where an exclusive meaning is intended, the language "x is composed of y" will be used, meaning that x includes only y and nothing else. In this document, "controller" is intended to include any hardware which is suitable for controlling (e.g. providing instructions to) one or more other components. For example, a processor equipped with one or more memories and appropriate software to process data relating to a component or components and send appropriate instructions to the component(s) to enable the component(s) to perform its/their intended function(s).

In one respect, the present disclosure concerns a grid-based automated storage and retrieval system in which a rail is located within the grid. One or more robotic picking arms may be movably mounted on the rail such that the robotic picking arm is received underneath the top level of the grid.

The invention claimed is:

1. A storage system comprising:
a first set of tracks extending in a first direction;
a second set of tracks extending in a second direction transverse to the first direction, to form a grid comprising a plurality of grid cells,
a framework structure on which the first set of tracks and the second set of tracks are received such that a stack of containers may be stored below the plurality of grid cells;
a plurality of load-handling devices for lifting and moving containers stacked in stacks within the storage system, each of the load-handling devices being configured to move on the tracks above the stacks of containers at a top level of the grid;
a rail received within the framework structure and underneath the top level of the grid;
a robotic picking device comprising a robotic arm movably connected to the rail, such that the robotic picking device is received beneath the top level of the grid; and
one or more picking zones adjacent to the rail wherein in use the load-handling devices are configured to lower containers to or to lift containers from the one or more picking zones.

2. A storage system according to claim 1, wherein a mezzanine level comprises eight zones surrounding the robotic arm.

3. A storage system according to claim 2, wherein the eight zones are divided into a first region and a second region wherein the first region and the second region each comprise one or more zones for receiving a delivery container and one or more zones for receiving a storage container.

4. A storage system according to claim 3, wherein the eight zones are divided into a first region and a second region wherein the first region and the second region each comprise one zone for receiving a delivery container and three zones for receiving a storage container.

5. A storage system according to claim 1, wherein the one or more picking zones are at least two levels below the top level of the grid.

6. A storage system according to claim 1, wherein a load-handling device is operative to lower a container from the top level of the grid to a mezzanine level.

7. A storage system according to claim 1, wherein a load-handling device is operative to lift a container from a mezzanine level to the top level of the grid.

8. A storage system according to claim 1, wherein the robotic arm is configured to select an item from a first container and to transfer it to a second container.

9. A storage system according to claim 8, wherein the first container is located on a first side of the rail and the second container is located on a second side of rail such that the first container is located opposite to the second container.

10. A storage system according to claim 8, wherein the robotic arm is configured to transfer an item from the first container to the second container without moving along the rail.

11. A storage system according to claim 1, wherein one or more cameras are mounted on the robotic arm.

12. A storage system according to claim 1, wherein the robotic arm comprises one or more optical sensors.

13. A storage system according to claim 1, wherein the robotic arm comprises one or more barcode scanners.

14. A storage system according to claim 1, wherein the robotic arm comprises a computing device, the computing device comprising one or more processing units, one or more volatile data storage units, one or more non-volatile data storage units and a network interface.

15. A storage system according to claim 1, wherein the storage system is communicably coupled to a computing device, the computing device comprising one or more processing units, one or more volatile data storage units, one or more non-volatile data storage units and a network interface.

16. A storage system according to claim 14, wherein the computing device comprises a controller apparatus which is configured, in use, to send signals to control operation of the robotic arm.

17. A storage system according to claim 1, wherein the robotic arm comprises one or more end effectors.

18. A storage system according to claim 17, wherein the robotic arm is configured to exchange a first end effector for a second effector.

19. A storage system according to claim 1, wherein the storage system comprises a plurality of robotic picking devices movably connected to the rail.

20. A storage system according to claim 1, wherein the storage system comprises a first picking zone and a second picking zone, wherein the first picking zone comprises one or more grid cells adjacent to a first side of the rail and the second picking zone comprises one or more grid cells adjacent to a second side of the rail.

* * * * *